Jan. 12, 1965 S. HANSEN 3,165,632
STAR-TRACKING SYSTEM USING A FREQUENCY MODULATED CARRIER WAVE
Filed Oct. 4, 1950 3 Sheets-Sheet 1
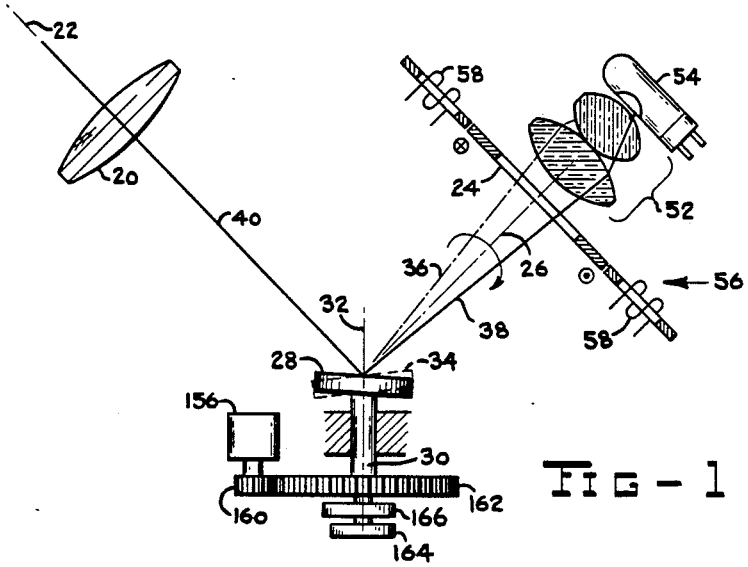
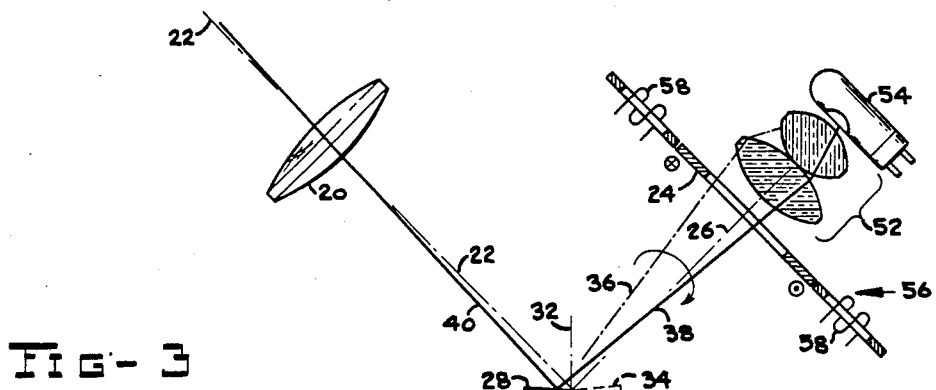
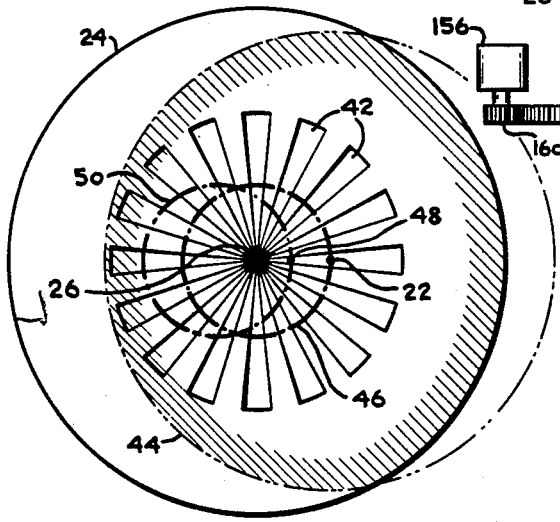
INVENTOR.
SIEGFRIED HANSEN Jan. 12, 1965   S. HANSEN   3,165,632
STAR-TRACKING SYSTEM USING A FREQUENCY MODULATED CARRIER WAVE
Filed Oct. 4, 1950   3 Sheets-Sheet 2
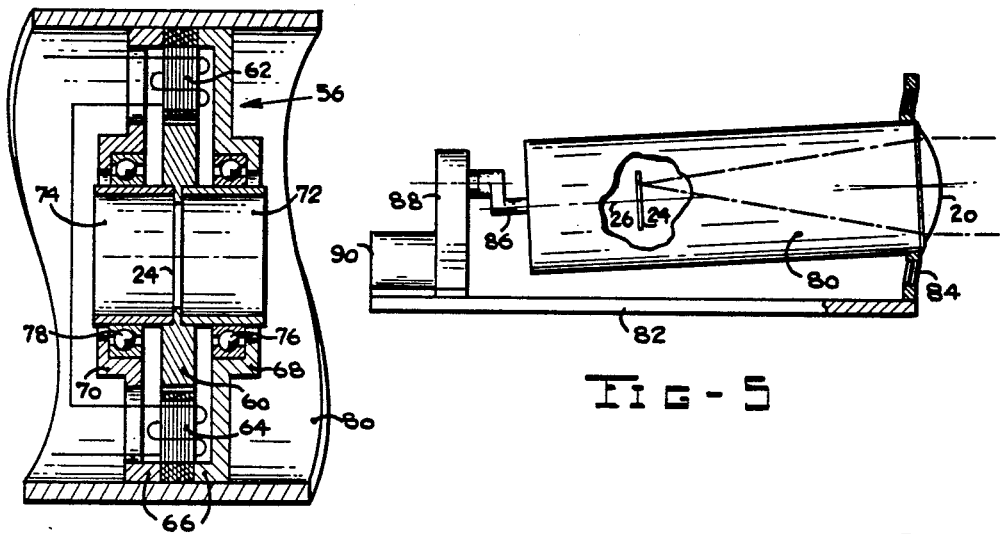
FIG-4
FIG-5
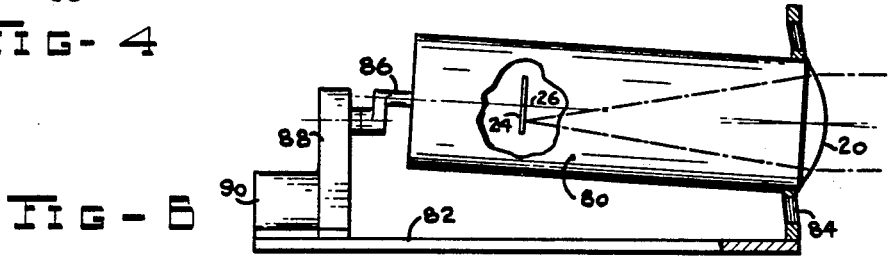
FIG-6
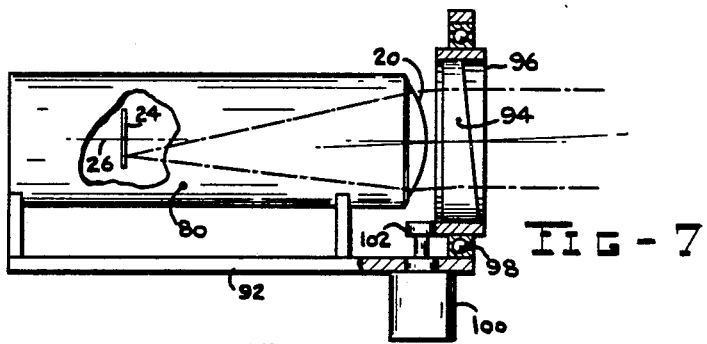
FIG-7
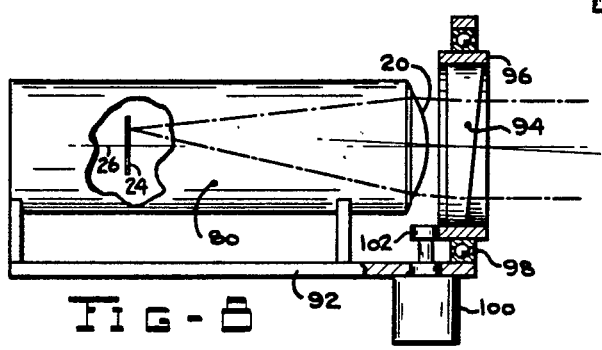
FIG-8
INVENTOR.
SIEGFRIED HANSEN
BY Nicholas T Volin
atty.

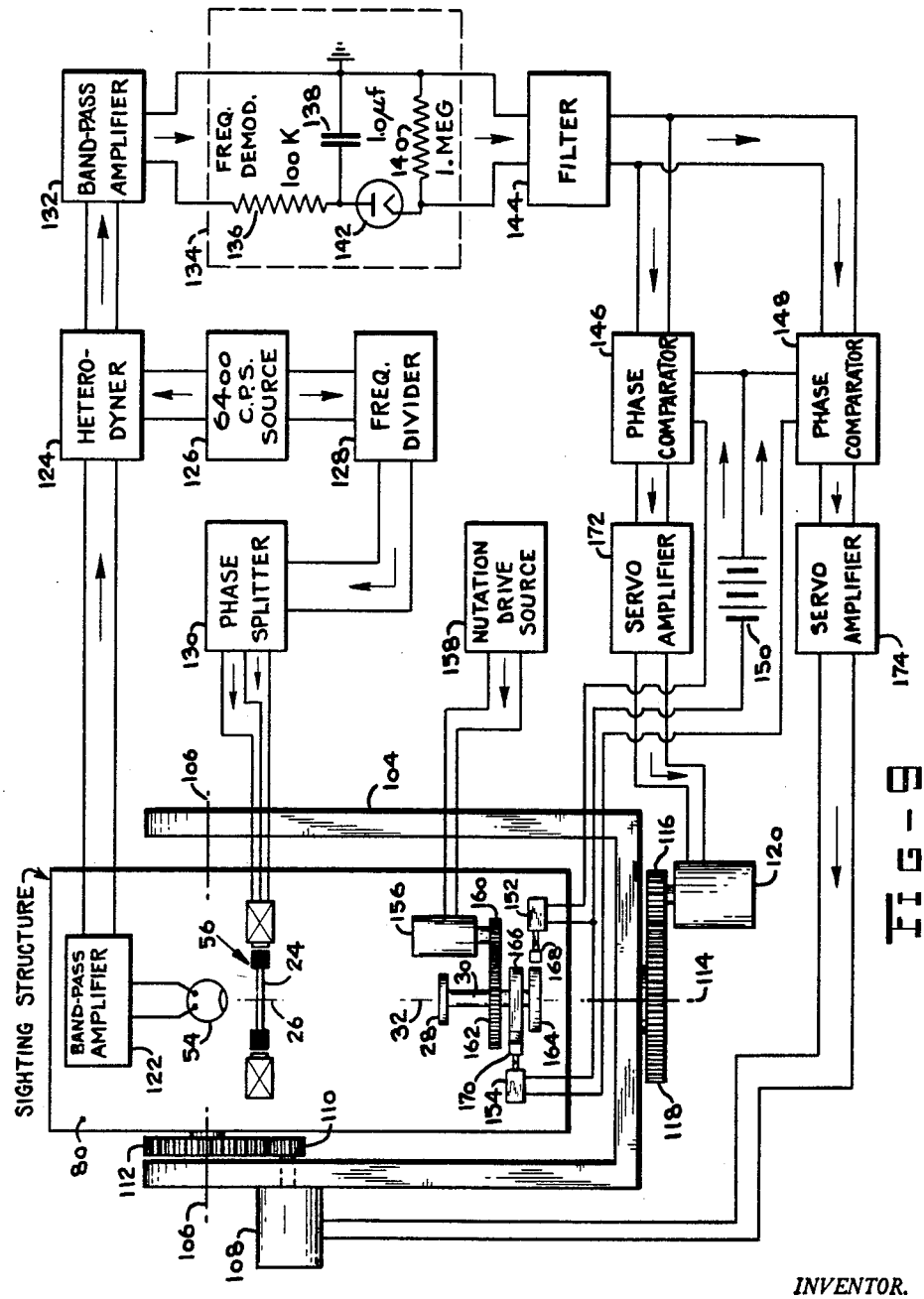

United States Patent Office 3,165,632
Patented Jan. 12, 1965

3,165,632
STAR-TRACKING SYSTEM USING A FREQUENCY MODULATED CARRIER WAVE
Siegfried Hansen, Los Angeles, Calif., assignor, by mesne assignments, to Hughes Aircraft Company, a corporation of Delaware
Filed Oct. 4, 1950, Ser. No. 188,401
12 Claims. (Cl. 250—203)

This invention relates to electrooptical apparatus, and particularly to star-tracking systems for employment under illuminated sky conditions.

There have been developed automatic star-trackers which are intended to be operative during daylight hours despite the fact that stellar bodies are then very poorly, if at all, visually discernible. One such star-tracker will first be briefly described in a general way, together with the effect of certain conditions of operation to which it may be exposed, in order to provide an understanding of a serious problem which arises under such conditions and which is overcome by practice of the present invention. The star tracker referred to is of an advanced type described in my copending U.S. Patent application S.N. 771,762 filed Sept. 2, 1947, now U.S. Patent No. 2,981,843, issued April 25, 1961, and entitled "Star-Tracking System." In this star-tracker, discrimination of a stellar body from the background sky is achieved by a scanning arrangement designed to produce a chopping or pulsing action upon the starlight without appreciable effect upon the general level of the background illumination. In this scanning arrangement, an image of a limited field of view encompassing a stellar body is projected against a shutter or diaphragm having a plurality of apertures, and a cyclic movement is imparted to the field image, relative to the shutter, so that the imaged stellar body comes into intermittent registry with the apertures. The radiation signal or radiant flux thus "seen" through the diaphragm apertures, by a photocell or other light-sensitive device, is ordinarily regarded as having a substantially constant background level, upon which starlight pulses are superimposed by virtue of the intermittent registry action. These pulse variations of radiant flux or radiation signal are translated by the light sensitive device and associated circuitry into corresponding electrical signals, hereinafter termed star signals.

It may be here noted that an end function of scanning arrangements in general is to impart certain characteristics to the star signals, dependent upon the relative star-position in the field of view, and from which readily utilizable star-position information may therefore be derived by suitable circuitry. In the scanning arrangement disclosed in the aforementioned copending application, the particular characteristic imparted to the star signals is a modulation of pulse repetition frequency, in which the frequency deviation and the relative phase of the frequency modulation component correspond to and thus define the polar coordinates of the relative star-position.

In theory, the variations present in the radiation signal applied to the photocell are limited to the starlight pulses resulting from the scanning process as referred to above, and this is in fact the case when the star-tracking system is employed under nighttime or near-black sky conditions, or under daylight conditions in the complete absence of equipment vibration. Certain applications of such a star-tracker, however, call for its operation during daylight hours under conditions in which the optical system is unavoidably subject to a certain amount of vibration, resulting in the production of spurious signals which prevent proper performance of the star-tracker. This may be understood by considering that there is a variation in brightness over the daytime sky, and that any instability or variation, as to the particular sky region embraced by a field of view, is therefore accompanied by a variation in the total flux seen through the shutter apertures. It is this variation in flux as seen by the illumination conversion device, taking place in a vibration frequency range normally encompassing the pulse repetition frequency of the star signals, that gives rise to the interfering spurious signals which in fact may completely mask the star signals.

The radiant flux of background daytime sky seen by a typical optical system is of such magnitude that the relative amplitude of radiation signals or radiant flux pulses (as seen through the shutter apertures) due to the presence in the field of view of even so bright a star as Betelgeuse, is of the order of no more than one part in a million. But the illumination gradient in the daytime sky region encompassing the stellar body of interest may, for example, amount to about 1% per degree at an elevation of 45 degrees, so that so small a shift in the field of view as ⅓ of a second in arc (¹⁄₁₀,₀₀₀ degree) would be evidenced by spurious signals having the same amplitude as the star signals. It is thus apparent that star signal masking interference can take place as a result of vibration of extremely small magnitude, or from any cause which results in even an extremely small variation as to the particular sky region embraced by a field of view. As already indicated, this poses a troublesome and serious problem in star-tracking equipment intended for operation under illuminated sky conditions.

Expressed in a very general manner, the present invention overcomes the masking interference difficulty by providing radiation signals at such frequencies as to lie outside of the interference frequency range, followed by translation of the radiation signals into corresponding electrical or star signals, and by electrical isolation of the star signals from the spurious signals. The complete apparatus derives star-position information from the isolated star signals in a manner somewhat similar to that described in my above-mentioned copending application, this star-position information, however, being free from such errors as would be imposed by interfering effects of spurious signals.

In preferred embodiments of the present invention, a high frequency or carrier frequency characteristic is imparted to the radiation signals in a special manner to be described. While other methods of increasing star signal frequencies are available, they would not be as fully satisfactory. For example, to increase the radiation signal frequencies to the necessary high values merely by increasing the number of apertures in the shutter or scanning member would require, on the one hand, an impractical degree of resolution in the optical system, and on the other hand, such a large number of apertures as to make the fabrication of such a scanning member unfeasible. As another example, referring in particular to the type of scanning arrangement in which the movement of the field image relative to the shutter imparts a frequency-modulation characteristic to the star signals, merely to increase the number of apertures to no more than a practical value from the standpoint of fabrication and optical resolution, and to appropriately increase the rate of cyclic movement of the field image relative to the shutter, would cause the deviation rate, that is, the frequency of the modulation waveform, to assume large values, an undesirable condition from the standpoint that this would require signal amplification over a wider band with the consequent production of an increased noise level. Preferred embodiments of the present invention, therefore, involve a special scanning arrangement as will be described, in which, briefly, an optical heterodyning action is achieved by imparting rotation to the shutter in addition to the cyclic movement of the field image relative to the shutter.

It is the principal object of the present invention to provide an improved astrometrical system for electro-optical determination of star-position information with immunity from masking interference normally caused by apparatus vibration under conditions of non-uniform sky illumination.

It is another object to provide an improved electro-optical astrometrical system for continuously and automatically tracking a source of radiant energy.

It is a further object to provide an electrooptical apparatus in which starlight signals are produced at frequencies lying outside the range of any interfering spurious signals which may be present.

It is still another object to provide an electrooptical apparatus in which radiation signals are increased in frequency by an optical heterodyning action.

For a better understanding of the present invention, together with further objects and features thereof, the following detailed description is given with reference to the accompanying drawing in which:

FIG. 1 illustrates a typical scanning arrangement in accordance with the present invention, including a representation of optical paths corresponding to a trained condition of the optical system or sighting structure;

FIG. 2 shows the same arrangement as in FIG. 1, but illustrates optical paths which correspond to a condition in which the sighting structure is not accurately trained;

FIG. 3 is a face view of a multi-apertured shutter utilized in the scanning arrangement shown on FIGS. 1 and 2, further illustrating the paths traversed by a near-point image projected thereagainst;

FIG. 4 is a simplified cross-sectional view of a hollow shaft hysteresis-type motor which includes the multi-apertured shutter as part of its rotor structure;

FIGS. 5 and 6 illustrate an embodiment in which relative nutation of an imaged field of view is achieved by eccentric motions applied to the entire sighting structure;

FIGS. 7 and 8 illustrate another modification in which the nutational characteristics are obtained by use of a rotating optical wedge; and FIG. 9 illustrates, in essentially schematic and block diagram form, a complete system in which the scanning arrangement and associated circuitry and positioning apparatus function to automatically and continuously train the sighting structure directly upon a stellar body of interest.

Referring now to the schematic representation in FIG. 1 of the drawings, there is shown an assembly of optical, shutter and photocell components of the inventive scanning system, including an indication of motions imparted to both the field image and shutter, the general arrangement being the same as that illustrated in the aforementioned copending application insofar as the means employed for nutation of the field image is concerned. The sighting structure includes a lens system here shown as having an objective lens 20 for providing an image of a field of view encompassing a stellar body of interest, the field of view being centered about an optical or sighting axis 22. It is to be understood that axis 22 of the sighting structure may be pointed toward a stellar body of interest by any desired mechanical or electro-mechanical means, as by the servo-motor system later referred to. In a complete and fully automatic system as here contemplated, sighting axis 22 is in fact not merely pointed toward but trained directly upon the stellar body of interest, and a departure from this training condition is very quickly and automatically corrected by the development of star-position signals and by their corrective action in an associated servo system which will be described later.

The field image formed by objective lens 20 is projected against a shutter or scanning member 24 having an aperture pattern later described in detail, and a circular translational motion is imparted to the field image relative to shutter 24 so that any star image in the field traces a circular path upon the shutter. In the embodiment shown in FIG. 1 (and in FIG. 2), this is accomplished by causing optical axis 22 and, of course, the image of the star being tracked, to nutate about an axis 26 extending through the predetermined point center of shutter 24. The nutational motion is here produced by a rotating tilted mirror 28 which is positioned to reflect light arriving along optical axis 22 toward shutter 24. Mirror 28 is so mounted upon a shaft 30 that its reflecting surface is tilted to a small extent from perpendicularity to its axis of rotation 32. The orientation of mirror 28 relative to objective lens 20 thus varies continuously during a revolution of shaft 30, and causes the field image projected against shutter 24 to execute the desired nutation or circular translational motion about axis 26. The extreme positions taken by the mirror during its rotation, as seen in FIG. 1, are indicated by the full and broken lines 28 and 34, respectively. The corresponding positions taken by that portion of the line-of-sight which extends from mirror 28 toward diaphragm 24, for the conditions shown in FIG. 1 in which the line-of-sight coincides with sighting axis 22, is indicated by the full and broken lines 38 and 36, respectively.

In FIG. 2, illustrating the same structure as in FIG. 1 but in different training attitude, these full and broken lines 38 and 36 correspondingly represent extreme positions assumed by the line-of-sight 40 for the condition in which sighting axis 22 is not trained directly upon the stellar body but diverges from line-of-sight 40, as indicated.

An enlarged face view of scanning member 24 is given in FIG. 3, which illustrates a spoke-pattern of apertures 42 therein and includes a representation of an instantaneous position of the field of view 44 projected thereagainst, this position corresponding to the full-line position of the tilted mirror as shown at 28 in FIG. 1. The apertures extend radially from the shutter's predetermined central point which is defined by axis 26, and are here shown to be sixteen in number, sectoral in form, and separated by opaque areas of equal size and shape. It is to be understood, however, that the apparatus may utilize shutters having other number of apertures, and that apertures of different configuration may be provided, for after an understanding of the present invention these become essentially matters of choice and design.

As set forth above, a translational circular motion is imparted to projected field image 44 relative to shutter 24, causing the field's centrally located reference point, which is defined by an extension of optical axis 22 passing therethrough, and which is displaced from the shutter's predetermined central point 26, to repetitively trace a circle 46 centered upon the shutter's central point. Inasmuch as the nutation previously referred to imparts a translational character to the circular displacement of the field image, any other point in the field image, as for example, point 48 representing an imaged stellar body or other object of interest in the field of view, traces a circle 50 which is of equal size but displaced relative to the circle traced by the image field central point.

It is apparent that for the condition when the optical axis 22 is accurately trained upon a stellar body, as indicated in FIG. 1, causing the stellar body to be imaged at the centrally located reference point in the field image (FIG. 3) and to trace the concentric circle shown at 46 in FIG. 3, the registration of the stellar image with apertures 42 correspondingly takes place at a uniformly constant rate. Similarly, for a condition in which there is divergence between sighting axis 22 and the true line of sight 40 to a stellar body in the field of view, as indicated in FIG. 2, an eccentric circle such as that shown at 50 in FIG. 3 is traced by the imaged stellar body, causing the registration to take place at a rate which varies during each complete cycle of imaged field nutation. In particular, the registration rate bears a frequency modulation characteristic in which the extent of frequency variation and the phase of the frequency variation waveform are dependent upon the magnitude and direction, respectively, of the displacement of image point 48 from the centrally located reference point 22 in field image 44, corresponding to the magnitude and direction, respectively, of the divergence of sighting axis 22 from the true line-of-sight 40 to the stellar body of interest.

The scanning structure includes a condenser lens system 52, shown in FIGS. 1 and 2, which receives radiation signals of radiant flux passed by the shutter apertures and causes this flux to converge upon the sensitized element of photocell 54. A photocell amplifier, associated with photocell 54 as later shown in a block diagram circuit, translates the radiation signals impinging upon the photocell into corresponding electrical or star signals. Additional circuit components, also later shown and described, function to derive position signals from the frequency modulation characteristic of the star signals, these position signals corresponding to and therefore defining the divergence of the sighting axis from a line-of-sight to the object of interest, corresponding to the location of the stellar body relative to the centrally located reference point in the field. The position signals may, of course, be utilized in any desired manner, for example to control a cathode ray tube presentation and thus provide visual indication of the relative orientation of the line-of-sight, or to automatically train the sighting axis of the system upon the stellar body of interest.

The star-tracker structure as thus far described is similar to that disclosed in the previously mentioned copending application. In accordance with the present invention for overcoming or avoiding the star signal masking or interference difficulties already described, the embodiment here disclosed further involves rotation of shutter 24 at a relatively high rate, achieving an optical heterodyning effect upon the frequency modulated radiation signal, without similarly affecting the radiation fluctuations which are attributable to field illumination variations as seen by the shutter. In further accord with principles of the invention, the carrier-frequency radiation signals resulting from this optical heterodyning arrangement are translated into corresponding electrical or star signals, and heterodyned against a reference signal of suitable frequency to extract a low frequency modulated electrical signal. In particular, the latter signal is a frequency-modulated signal corresponding to that which would be produced by field nutation alone, but substantially free of spurious components, this low frequency electrical signal being hereinafter termed the low-frequency-star signal. From this point on, the remaining circuitry and apparatus, later shown and described, function to derive and utilize position signals in basically the same manner as in the aforementioned copending application.

Referring again to FIGS. 1 and 2, shutter 24 may be spun about its axis 26 by a hysteresis motor 56 of hollow shaft type, here shown schematically as having a field structure 58 which acts directly upon shutter 24 as the rotor element. This type of motor is presently preferred for the reason that it enables shutter 24 to be positioned within or form part of the rotor structure, eliminating gearing problems. FIG. 4 illustrates such an arrangement in greater detail, reference numeral 24 again designating the shutter, which in this instance is fabricated of hardened steel having high magnetic retentivity. The thickened rim 60 of the shutter forms the active part of the motor armature, driven by a rotating field produced by quadrature voltages applied to the stator windings of the motor. While but two pole structures 62 and 64 are here shown, it is to be understood that the motor stator includes another such pair of poles, at right angles to that shown, as is conventional and necessary for production of a rotating field. The poles and field windings forming the stator structure are contained within a frame member 66 which also provides bearing supports 68 and 70 for the rotor assembly. Shutter 24, together with steel tubes 72 and 74 engaging opposite faces thereof as by the indicated press fit, are supported within the stator by means of ball bearing structures 76 and 78 as shown. The resultant assembly is mounted within the sighting structure 80 in such manner as to position central axis 26 of the shutter in coincidence with the rotor's axis of rotation.

The apparatus thus far described makes use of a tilted rotating mirror to nutate the field image relative to the shutter. The nutation may, of course, be achieved by various other arrangements. For example, referring to FIGS. 5 and 6, sighting structure 80 may be mounted in a manner permitting limited angular movement relative to a reference platform 82, as by means of an annulus 84 made of flexible material, secured as shown to reference platform 82 and to the sighting structure at the end bearing objective lens 20. An eccentric motion of the other end of sighting structure 80 may be provided by means of a crank 86 secured to the sighting structure and driven through reduction gearing 88 by a motor 90 as indicated. The eccentric motion thus obtained causes a nutational displacement of shutter 24 relative to the sighting structure's optical axis 22, as is evident from a comparison of FIGS. 5 and 6, and correspondingly causes any imaged stellar body contained in the field of view to traverse a circular path, relative to shutter 24, in a manner fully equivalent to that already described with reference to the nutating structure shown in FIG. 1.

As another example, the arrangement shown in FIGS. 7 and 8 may be employed, this arrangement again providing nutation of the optical axis as in the tilted rotating mirror type of scanner already described. As here shown, sighting structure 80 is fixedly supported relative to a frame member 92, and an optical wedge or prism 94 is positioned in front of objective 20 and rotated to produce nutation of optical axis 22 relative to diaphragm 24. Wedge 94 is mounted within a short tube 96, being bearinged as indicated at 98 to place the rotational axis of the wedge in collinear relationship to central axis 26 of diaphragm 24. Rotation of the tube 96 carrying wedge 94 may be accomplished by means of a geared-head motor 100, as shown, which drives a rubber tired wheel 102 making rolling friction engagement against the rim of tube 96. Again, a comparison of FIGS. 7 and 8 will indicate that variation in the rotational position of wedge 94 causes the imaged field of view to shift its position relative to shutter 24, this shift taking place with circular translation as already described with reference to FIG. 3.

It is to be understood, of course, that the modifications described above, with reference to FIGS. 5 and 7, are intended to include rotation of shutter 24 at a speed sufficiently high to result in herterodyned star signals at frequencies lying beyond the range of spurious signal frequencies, and that this shutter rotation may be imparted by a motor of the type already described with reference to FIGS. 1, 2, and 4, or by any other means having constant speed and inappreciable vibration.

Referring again to the heterodyning scanning arrangement, shutter 24 may be rotated at a speed of 400 revolutions per second, and the nutational motion of the star image relative to the aperture pattern may be designed to take place at the rate of ⅛ revolution per second. For a shutter having 16 apertures in a spoke pattern as illustrated, the resultant radiation signals occur at a carrier frequency of either 6398 or 6402 c.p.s., depending upon the relative directions of the image nutation and shutter rotation. FIG. 1 indicates rotation of shutter 24 in a direction counter to the nutational displacement of the star image, and the resultant carrier frequency in this instance is therefore equal to the sum of the pulse frequencies which would result from the separate rotational and nutational movements. The center frequency which would be produced by the nutational motion alone, that is, by the movement of the imaged stellar body in a circular path relative to the multi-apertured shutter, is 2 c.p.s. The heterodyning frequency arising from rotation of the shutter is 6400 c.p.s., and the center or carrier frequency of the starlight pulses resulting from the illustrated combination is correspondingly 6402 c.p.s.

FIG. 9 illustrates a complete and fully automatic system employing the present invention. in which a sighting structure and scanning arrangement supply star signals as already described, and in which an electrical translation device derives position signals from these star signals for automatically training the sighting structure directly upon the stellar body. As here indicated schematically, sighting structure 80 is supported within a frame member 104 for angular displacement in elevation about a horizontal axis 106, movements about this axis being controlled by means of a servo-motor 108 through gears 110 and 112 as indicated. Frame member 104 itself is mounted for angular displacement, its orientation in azimuth about a vertical axis 114 being controlled, through gears 116 and 118, by means of a servo-motor 120 as shown. Sighting structure 80 may thus be trained in any direction by the combination of its angular movements in both elevation and azimuth.

The photocell 54 contained within the sighting structure is coupled to a bandpass amplifier 122 which is of suitable design to be responsive to variations in the radiation signal impinging upon the photocell, for producing corresponding voltage variations of sufficient magntude to be utilized by a heterodyner circuit 124. Amplifier 122 may, for example, be miniaturized and contained within the sighting structure 80 as indicated, and may be designed to have a practical bandpass characteristic of say 6350 to 6450 c.p.s., the carrier frequency of 6402 c.p.s. falling about midway between these limits. Spurious signals having frequencies lying outside of this bandpass range, as already described, will correspondingly suffer major attenuation at this point and only a negligible portion of these spurious signals will appear in the output of amplifier 122. Even this portion of the spurious signals, however, is eventually eliminated within the second bandpass amplifier 132, as described below.

The multi-apertured shutter and the field image movements relative thereto, having the characteristics and design constants already mentioned, cooperate to provide a frequency variation range of 4 c.p.s., theoretically, to the radiation signals and correspondingly to the star signals. Thus, the amplified star signals delivered by amplifier 122, and applied to heterodyning circuit 124, may have frequencies lying within the frequency band centered about a frequency of 6402 or 6398 c.p.s., from which spurious signal frequencies are far removed.

Heterodyner 124 functions to convert these carrier frequency star signals to a frequency-modulated signal with a two-cycle per second center frequency which corresponds to the two-cycle signal which would have been generated by shutter 24 if shutter 24 was not rotated. To this end, the local or reference signal necessary for heterodyner 124 is obtained from a 6400 c.p.s. source 126. The 400 c.p.s. quadrature voltages necessary for driving diaphragm motor 56 are also derived from source 126 by means of a frequency divider 128 and phase splitter 130, as indicated, this synchronizing the rotation of shutter 24 with the heterodyning frequency impressed on heterodyner 124 by the same oscillator. This frequency-modulated low-frequency output signal from heterodyner 124, however, is substantially free from spurious signals at interfering frequencies, for the sum and difference signals corresponding to any spurious vibration signal input to the heterodyner are far removed in the frequency spectrum from the desired low-frequency star signals. It is again emphasized at this point that the optical heterodyning action produced by rotation of the shutter affects only the frequency produced by the imaged stellar body, without similarly affecting the frequency of spurious vibration signals.

The remaining functions and actions of the circuitry and structure here shown are basically the same as in the equipment described in my previously mentioned copending application. The difference frequency signals developed by heterodyner 124, constituting the low-frequency star signals, are applied to a band pass amplifier 132, which is designed to amplify over a narrow band centered at a 2 c.p.s. frequency and thus eliminates any spurious vibration signals which may be presented to its input terminals. The signal delivered by bandpass amplifier 132 bears the frequency modulation characteristics produced by the nutational action in the described scanning arrangement, the deviation or extent of frequency variation and the phase of the frequency variation waveform being dependent upon the magnitude and direction, respectively, of the divergence of sighting axis 22 from line-of-sight 40.

The modulation component of the signal delivered by bandpass amplifier 132 is isolated by use of a frequency demodulator or detector circuit 134 designed for operation at the relatively low frequencies here employed. The frequency demodulator 134 here shown includes an integration network, comprising a resistor 136 and capacitor 138 having values as indicated, which functions to attenuate the higher frequencies to a greater extent than the lower frequencies, or expressed in another manner, to emphasize the lower frequencies. Amplitude modulation is thus imparted to the signal developed across capacitor 138, this amplitude modulation corresponding in magnitude and phase to the frequency deviation and phase of the frequency modulated star signal. The output signal voltage, developed across the 1.0 megohm resistor 140 in frequency demodulator 134, exhibits a fundamental envelope frequency of ⅛ c.p.s., this signal resulting from rectifying action of diode 142 upon the amplitude modulated signal presented thereto by the integrator portion of demodulator 134. The signal output of demodulator 134, although carrying ripple components, is thus basically an error or position signal having amplitude and phase characteristics which depend upon, and, therefore, define the magnitude and direction of the sighting structure's training error. For practical use of this error signal, its ripple components are in effect smoothed or removed by action of a filter 144.

The amplitude and phase characteristics of the filtered error signal define the training error in what is effectively a polar coordinate system. Since the particular mount which has been here described is intended to accommodate sighting structure movements in elevation and azimuth, the training error signal is resolved into two coordinate position signals corresponding to azimuth and elevation errors, respectively. This is accomplished by means of a pair of phase comparators which evaluate the magnitudes of quadrature components of the error signal. The error signal is applied to phase comparators 146 and 148, as shown, to which are also applied quadrature reference signals having a repetition frequency corresponding to the cyclic nutation rate of the imaged field relative to diaphragm 24. These reference signals may, for example, be obtained from the simple structure and circuitry here shown schematically, in which quadrature square-wave voltages are derived from source 150 and applied to phase comparators 146 and 148 by means of synchronized cam follower actuation of switches 152 and 154. A motor 156, energized as indicated by power from a nutation drive source 158, drives shaft 30 and the mirror 28 mounted thereon at a rotational speed of ⅛ revolution per second, through gearing here indicated schematically as comprising a pinion gear 160 and driven gear 162. Cam plates 164 and 166 are secured to shaft 30 for rotation therewith, and are designed and arranged to actuate the switches 152 and 154, through cam followers 168 and 170, respectively, during half cycles and in phase quadrature as referred to the cyclic nutation action of mirror 28. The resultant output signals from the phase comparators are position signals which in effect are dependent upon the azimuthal and elevational deviations of sighting axis 22 from line-of-sight 40, corresponding to the abscissa and ordinate of the stellar body, as seen in the field of view and relative to reference point 22 therein.

The output signal from phase comparator 146 is a position signal which corresponds to the azimuthal pointing error and controls a servo amplifier 172 to drive servo-motor 120 in a direction tending to reduce this error, this action continuing until this error is in fact reduced to substantially zero. Similarly, the output signal from phase comparator 148, is a position signal corresponding to the pointing error in elevation and controls another servo amplifier 174 and servo-motor 108 to correctly train sighting structure 80 in elevation. Thus, the servo-controlling action of the position signals as described tends to maintain sighting axis 22 in trained condition relative to any stellar body of interest toward which the sighting structure 80 is initially pointed.

While the scanning system here described is of a type which imparts frequency-modulation characteristics to the radiation signals, it is to be understood that the novel principles or procedures which include optical heterodyning to overcome the masking effect of spurious signals may also be applied to scanning systems which impart other position-identifying characteristics to the radiation signals.

It should also be apparent that while the description of the invention as given above has been principally with reference to a typical embodiment which determines the relative location of a stellar body, the invention may also be utilized for the production and utilization of position signals relating to any other object having distinctive radiation characteristics as compared to adjoining regions in the field of view. It is therefore to be understood that various modifications and other uses may be made which nevertheless lie within the spirit and scope of the invention as defined by the appended claims.

What is claimed is:

1. An electrooptical apparatus for tracking a source of radiant energy, said apparatus comprising: a movable optical system having an optical axis and means for intercepting and focusing a portion of said energy as an image in a plane; nutating means for nutating said image about a circular path in said plane, said path having an axis coincident with a predetermined point in said plane when said optical axis is directed at said source, said path axis diverging from said predetermined point when said optical axis is deflected from said source; a rotatable shutter disposed in said plane; means for rotating said shutter to convert said focused energy into a frequency-modulated radiation signal, the frequency modulation of said signal corresponding to the divergence of said path axis from said predetermined point; and translating means positioned to intercept said radiation signal, said translating means being responsive to the frequency modulation of said radiation signal for moving said optical system to direct said optical axis at said source.

2. An electrooptical apparatus for tracking a source of radiant energy, said apparatus comprising: a movable optical system having an optical axis, said optical system focusing a portion of said energy as an image in a plane perpendicular to said axis; nutating means for nutating said image in a circular path about a nutation axis, said path having an axis aligned with said nutation axis when said optical axis is directed at said source, said path axis diverging from said nutation axis when said optical axis is deflected from said source; scanning means, disposed in said plane and positioned to intercept the focused portion of said energy, for frequency modulating and optically heterodying said portion of said energy to produce a carrier frequency radiation signal, the frequency modulation of said radiation signal being a function of the divergence of said path axis; and translating means, positioned to intercept said carrier frequency radiation signal, said translating means being responsive to the frequency modulation of said radiation signal for moving said optical system to direct said axis at said source.

3. A position-finding apparatus for training on a source of radiant energy, said apparatus comprising: movable optical means having an optical axis, said optical means being directable toward said source for focusing a portion of said energy as an image in a plane, and including means for nutating said image in a circular path in said plane, said path being concentric about a predetermined point in said plane when said axis is directed at said source, said path being eccentric about said predetermined point when said axis is deflected from said source; scanning means, disposed in said plane and positioned to intercept the focused portion of said energy, for frequency modulating and optically heterodying said focused energy to produce a frequency modulated carrier-frequency radiation signal, the frequency modulation of said radiation signal being a function of the position of said path relative to said predetermined point; and electrical translating means, positioned to intercept said radiation signal, said translating means being responsive to said frequency modulation of said radiation signal for producing a position signal having amplitude and phase corresponding to the degree and direction, respectively, of the deflection of said axis from said source.

4. An electrooptical apparatus for tracking a source of radiant energy, said apparatus comprising: movable optical means having an optical axis, said optical means being directable toward said source for focusing a portion of said energy as an image in a plane, and including means for nutating said image in a circular path in said plane, said path being centered about a predetermined point in said plane when said axis is directed at said source, said path being eccentrically displaced relative to said predetermined point when said axis is deflected from said source; scanning means, disposed in said plane and positioned to intercept the focused portion of said energy, for frequency modulating and optically heterodying said portion of said energy to produce a frequency modulated carrier frequency radiation signal, the frequency modulation of said radiation signal being proportional to the displacement of said path relative to said predetermined point; and translating means, positioned to intercept said radiation signal, said translating means being responsive to said frequency modulation of said radiation signal for moving said optical means to direct said axis toward said source.

5. The electrooptical apparatus defined in claim 4 wherein said scanning means includes: a rotatable shutter, having an axis, the point on said shutter lying on said shutter axis being coincident with said predetermined point; and means for rotating said shutter at a predetermined speed.

6. The electrooptical apparatus defined in claim 5 wherein said rotatable shutter includes a plurality of alternate transparent and opaque sectors, said transparent sectors and said opaque sectors having substantially identical shape and being convergent at said point on said shutter lying on said shutter axis.

7. An electrooptical apparatus for tracking a source of radiant energy, said apparatus comprising: a movable optical system having an optical axis, said optical system being directable toward said source for focusing a portion of said energy as an image in a plane; nutating means for nutating said image in a circular path in said plane, said path being centered about a predetermined point in said plane when said axis is directed at said source, said path being centered about a point displaced from said predetermined point when said axis is deflected from said source; scanning means, disposed in said plane and positioned to intercept the focused portion of said energy, for frequency modulating and optically heterodyning said portion of said energy to produce a carrier-frequency radiation signal, the frequency modulation of said radiation signal being a function of the displacement of said circular path relative to said predetermined point; electrical translating means, positioned to intercept said carrier-frequency radiation signal, said translating means being responsive to said frequency modulation of said radiation signal for producing an electrical error signal proportional to the deflection of said axis from said source; and servo means, coupled to said translating means and to said optical system, said servo means being responsive to said error signal for moving said optical system to direct said axis at said source.

8. The electrooptical apparatus defined in claim 7 wherein said electrical translating means includes: light-sensitive means for converting said carrier-frequency radiation signal into a corresponding electrical signal; heterodyning means for heterodyning said electrical signal to produce a low-frequency electrical signal, said low-frequency signal being frequency modulated in accordance with the frequency modulation of said radiation signal; and electrical detecting means responsive to said frequency modulation of said low-frequency electrical signal for producing a position signal, the amplitude and phase of said position signal being functions of the degree and direction, respectively, of the deflection of said axis from said source.

9. The electrooptical apparatus defined in claim 8 wherein said electrical detecting means includes: filter means electrically coupled to said heterodyning means for isolating said low-frequency electrical signal from spurious signals having different frequency characteristics; and frequency demodulation means electrically coupled to said filter means and responsive to said low-frequency electrical signal for producing said position signal.

10. In an apparatus for tracking a source of radiant energy wherein said apparatus includes optical means for focusing a portion of said energy as an image in a plane, the position of said image in said plane being a function of the training error of said optical means relative to said source, and electrical translating means for producing an electrical signal proportional to the training error of said optical means, a device for producing a frequency modulated carrier-frequency radiation signal proportional to said training error, said device comprising: nutating means for nutating the image in a circular path in said plane; a rotatable shutter, positioned in said plane to intercept said focused energy, for frequency modulating said focused energy, the frequency modulation being a function of the training error of said optical means; and driving means coupled to said shutter for rotating said shutter at a predetermined rate to optically heterodyne the frequency modulated energy to produce a frequency modulated carrier-frequency radiation signal, the carrier frequency of said radiation signal being a function of the predetermined rate of rotation of said shutter.

11. A position-finding apparatus for training on a source of radiant energy, said apparatus comprising: movable optical means having an optical axis, said optical means being directable toward said source for focusing a portion of said energy as an image in a plane; means for nutating the image in a circular path in said plane, the position of said path relative to a predetermined point in said plane being a function of the training error of said optical means; scanning means, disposed in said plane and positioned to intercept said focused energy, for frequency modulating and optically heterodyning said focused energy to produce a frequency modulated carrier-frequency radiation signal, the frequency modulation of said radiation signal being a function of the position of said path relative to said predetermined point; translating means, positioned to intercept said radiation signal, said translating means being responsive to said frequency modulated carrier-frequency radiation signal for producing a low-frequency electrical signal, said electrical signal being frequency modulated in accordance with said frequency modulation of said radiation signal; and detection means coupled to said translating means and responsive to said low frequency electrical signal for producing two coordinate signals corresponding to the azimuth and elevation, respectively, of said training error.

12. In an apparatus for training on a source of radiant energy wherein said apparatus includes movable optical means having an axis, said means being directable for focusing a portion of said energy as an image nutating about a circular path in a plane, and servo means responsive to an electrical signal derived from the position of said path in said plane for moving said optical means to direct said axis at said source; a system for deriving an electrical position signal corresponding to the position of said path in said plane, said system comprising: scanning means, disposed in said plane and positioned to intercept the focused portion of said energy, for frequency modulating and optically heterodyning said focused energy to produce a frequency modulated carrier-frequency radiation signal, the frequency modulation of said signal being a function of the training error of said optical means; translating means, positioned to intercept said radiation signal, said translating means being responsive to said radiation signal for producing a low frequency electrical signal, said electrical signal being frequency modulated in accordance with said frequency modulation of said radiation signal; and detection means coupled to said translating means and responsive to said electrical signal for producing an electrical error signal having magnitude and phase corresponding to the degree and direction, respectively, of said training error.

References Cited in the file of this patent

UNITED STATES PATENTS

| | | |
|---|---|---|
| 2,403,023 | Reynolds | July 2, 1946 |
| 2,403,975 | Graham | July 16, 1946 |
| 2,413,870 | Hammond | Jan. 7, 1947 |
| 2,424,193 | Rost et al. | July 15, 1947 |
| 2,439,294 | Hammond | Apr. 6, 1948 |
| 2,444,933 | Jasperson | July 13, 1948 |
| 2,462,925 | Varian | Mar. 1, 1949 |

FOREIGN PATENTS

| | | |
|---|---|---|
| 33,746 | Netherlands | Oct. 15, 1934 |

UNITED STATES PATENT OFFICE
CERTIFICATE OF CORRECTION

Patent No. 3,165,632 January 12, 1965

Siegfried Hansen

It is hereby certified that error appears in the above numbered patent requiring correction and that the said Letters Patent should read as corrected below.

Column 4, line 44, for "number" read -- numbers --; column 7, line 29, for "magntude" read -- magnitude --; line 63, for "this" read -- thus --; column 10, line 20, for "heterodying" read -- heterodyning --.

Signed and sealed this 18th day of May 1965.

(SEAL)
Attest:

ERNEST W. SWIDER
Attesting Officer

EDWARD J. BRENNER
Commissioner of Patents